United States Patent
McEathron et al.

(10) Patent No.: US 12,459,624 B1
(45) Date of Patent: Nov. 4, 2025

(54) MARINE DRIVES HAVING AN ELECTRIC MOTOR ASSEMBLY AND METHODS FOR MAKING THE SAME

(71) Applicant: Brunswick Corporation, Mettawa, IL (US)

(72) Inventors: William W. McEathron, Fond du Lac, WI (US); Vinodh Kumar Balakrishnan, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 126 days.

(21) Appl. No.: 18/303,897

(22) Filed: Apr. 20, 2023

(51) Int. Cl.
| | |
|---|---|
| B63H 21/17 | (2006.01) |
| B63H 21/36 | (2006.01) |
| F04D 13/08 | (2006.01) |
| H02K 5/10 | (2006.01) |
| H02K 9/00 | (2006.01) |

(52) U.S. Cl.
CPC ............ B63H 21/17 (2013.01); B63H 21/36 (2013.01); F04D 13/086 (2013.01); H02K 5/10 (2013.01); H02K 9/00 (2013.01)

(58) Field of Classification Search
CPC .......... B63H 21/17; B63H 21/36; H02K 5/10; H02K 5/132; H02K 5/20
See application file for complete search history.

(56) References Cited

U.S. PATENT DOCUMENTS

| | | |
|---|---|---|
| 3,298,349 A | 1/1967 | Friedrich et al. |
| 3,629,628 A | 12/1971 | Rank et al. |
| 3,791,331 A | 2/1974 | Dilley |
| 3,878,809 A | 4/1975 | Ray |
| 3,906,887 A | 9/1975 | Kappas |
| RE29,695 E | 7/1978 | Blake |
| 4,362,512 A * | 12/1982 | Johnson ............... B63H 20/007 318/473 |
| 4,559,016 A | 12/1985 | Piber |

(Continued)

FOREIGN PATENT DOCUMENTS

| | | |
|---|---|---|
| CN | 100353648 C | 12/2007 |
| CN | 203461081 | 3/2014 |

(Continued)

OTHER PUBLICATIONS

Sawyer, Kass W., et al. Unpublished U.S. Appl. No. 17/469,479, "Propulsion Devices Having Electric Motors for Marine Vessels and Methods for Making the Same", filed Sep. 8, 2021.

(Continued)

*Primary Examiner* — Kenneth J Hansen
(74) *Attorney, Agent, or Firm* — Andrus Intellectual Property Law, LLP

(57) ABSTRACT

A marine drive includes a torpedo housing having an open end and an electric motor assembly with an electric motor configured to power a propulsor for propelling the marine drive in water. The electric motor assembly includes a motor housing which is nested in the open end such that such that a first portion of the motor housing extends into the torpedo housing and such that a second portion of the motor housing extends from the torpedo housing and is exposed to the water for cooling thereof. The torpedo housing defines an opening which partially exposes the first portion of the motor housing to the water for cooling thereof.

18 Claims, 8 Drawing Sheets

(56) References Cited

U.S. PATENT DOCUMENTS

| | | |
|---|---|---|
| 4,728,306 A | 3/1988 | Schneider |
| 5,101,128 A | 3/1992 | Veronesi et al. |
| 5,197,910 A | 3/1993 | Kanno et al. |
| 5,403,216 A | 4/1995 | Salmi et al. |
| 5,509,830 A | 4/1996 | Garis, Jr. |
| 6,231,407 B1 | 5/2001 | Hein et al. |
| 6,312,298 B1 | 11/2001 | Shuring |
| 6,485,339 B1 | 11/2002 | Hartig et al. |
| 6,676,463 B2 | 1/2004 | Le Bert et al. |
| 6,685,516 B2 | 2/2004 | Tsuboguchi |
| 6,994,602 B2 | 2/2006 | Ries |
| 7,018,249 B2 | 3/2006 | Ries et al. |
| 7,147,523 B2 | 12/2006 | Mori et al. |
| 7,163,426 B2 | 1/2007 | Varis |
| 7,186,156 B2 | 3/2007 | Le Flem et al. |
| 7,189,126 B2 | 3/2007 | Ylitalo |
| 7,198,528 B2 | 4/2007 | Varis |
| 7,300,322 B2 | 11/2007 | Kitani et al. |
| 7,421,997 B2 | 9/2008 | Ishizaka et al. |
| 7,438,614 B2 | 10/2008 | Inaba |
| 7,448,929 B2 | 11/2008 | Huber et al. |
| 7,452,251 B2 | 11/2008 | Boebel |
| 7,569,954 B2 | 8/2009 | Tolle et al. |
| 8,298,025 B2 | 10/2012 | Eichinger |
| 8,517,785 B2 | 8/2013 | Danov et al. |
| D706,534 S | 6/2014 | Zwetzig |
| 9,446,830 B2 | 9/2016 | Hartmeyer et al. |
| 9,505,478 B2 | 11/2016 | Peselli |
| 9,783,279 B2 | 10/2017 | Kiiskila et al. |
| 9,816,423 B2 | 11/2017 | Shomura et al. |
| 9,902,478 B2 | 2/2018 | Lobell et al. |
| 10,020,706 B2 | 7/2018 | Kobes et al. |
| D829,436 S | 10/2018 | Benzon |
| 10,179,636 B2 | 1/2019 | Julliand et al. |
| 10,336,430 B2 | 7/2019 | Kosso et al. |
| 10,358,028 B2 | 7/2019 | Meunier et al. |
| 10,358,202 B2 | 7/2019 | Gil et al. |
| D865,355 S | 11/2019 | Benzon |
| 10,464,651 B2 | 11/2019 | Rebele et al. |
| D882,943 S | 5/2020 | Zhuang |
| 10,760,470 B2 | 9/2020 | Li et al. |
| 10,981,639 B2 | 4/2021 | Kimpara et al. |
| D922,062 S | 6/2021 | Shi |
| 11,066,143 B2 | 7/2021 | Doremus et al. |
| D931,600 S | 9/2021 | Huang |
| 11,148,778 B2 | 10/2021 | Nakamura |
| D936,355 S | 11/2021 | Webb |
| D939,206 S | 12/2021 | Baires |
| 11,208,189 B2 | 12/2021 | Nanjo et al. |
| 11,235,848 B1 | 2/2022 | Jaszewski et al. |
| 11,271,455 B2 | 3/2022 | Teofili |
| D950,945 S | 5/2022 | Bullock |
| 11,345,456 B2 | 5/2022 | Kjellman |
| 11,459,075 B2 | 10/2022 | Biebach et al. |
| D972,837 S | 12/2022 | Choi |
| D985,260 S | 5/2023 | Xie |
| D990,872 S | 7/2023 | Chen |
| D998,326 S | 9/2023 | Fang |
| 2004/0014380 A1 | 1/2004 | Varis et al. |
| 2008/0293312 A1 | 11/2008 | Scott |
| 2015/0017032 A1 | 1/2015 | Säkkinen |
| 2015/0017033 A1 | 1/2015 | Säkkinen et al. |
| 2017/0015397 A1 | 1/2017 | Mitchell et al. |
| 2017/0114705 A1 | 4/2017 | Suzuki |
| 2020/0309015 A1 | 10/2020 | Watanabe |
| 2020/0370463 A1 | 11/2020 | Saruwatari |
| 2021/0114705 A1 | 4/2021 | Biebach et al. |
| 2021/0139124 A1 | 5/2021 | Culpi et al. |
| 2021/0163111 A1* | 6/2021 | Lambregts ............... H02K 9/00 |
| 2021/0234434 A1* | 7/2021 | Lee ........................ H02K 9/19 |
| 2021/0276685 A1 | 9/2021 | Miyagi |
| 2022/0055728 A1 | 2/2022 | Kimpara et al. |
| 2022/0089261 A1 | 3/2022 | Bruestle |
| 2022/0089265 A1 | 3/2022 | Bruestle |
| 2022/0097816 A1 | 3/2022 | Nakev |
| 2022/0119084 A1 | 4/2022 | Miyagi |
| 2023/0043251 A1* | 2/2023 | Rasmussen ............ H02K 5/132 |
| 2023/0070725 A1* | 3/2023 | Sawyer ................. B63H 20/32 |

FOREIGN PATENT DOCUMENTS

| | | |
|---|---|---|
| CN | 203461081 U | 3/2014 |
| CN | 206117392 | 4/2017 |
| CN | 206117392 U | 4/2017 |
| CN | 109494935 | 3/2019 |
| CN | 109494935 A | 3/2019 |
| CN | 211656720 | 10/2020 |
| CN | 211656720 U | 10/2020 |
| CN | 215285224 | 12/2021 |
| CN | 215285224 U | 12/2021 |
| CN | 114302617 | 4/2022 |
| CN | 114302617 A | 4/2022 |
| DE | 2449595 | 4/1976 |
| DE | 2449595 A1 | 4/1976 |
| DE | 19801448 | 8/1999 |
| DE | 10000578 | 7/2001 |
| DE | 10000578 A1 | 7/2001 |
| DE | 19801448 C2 | 9/2001 |
| DE | 20311667 | 9/2003 |
| DE | 20311667 U1 | 10/2003 |
| DE | 102018214275 | 2/2020 |
| DE | 102018214275 A1 | 2/2020 |
| EP | 775630 | 5/1997 |
| EP | 816222 | 1/1998 |
| EP | 1010614 | 6/2000 |
| EP | 1047592 | 11/2000 |
| EP | 1100717 | 5/2001 |
| EP | 1228959 | 8/2002 |
| EP | 1047592 B1 | 9/2002 |
| EP | 775630 B1 | 10/2002 |
| EP | 1010614 B1 | 10/2002 |
| EP | 816222 B1 | 12/2002 |
| EP | 1100717 B1 | 3/2003 |
| EP | 1228959 B1 | 4/2004 |
| EP | 1250256 | 8/2005 |
| EP | 2098447 | 9/2009 |
| EP | 2420443 | 2/2012 |
| EP | 2420443 B1 | 8/2014 |
| EP | 2762402 | 8/2014 |
| EP | 2994380 | 3/2016 |
| EP | 2994381 | 3/2016 |
| EP | 3006326 | 4/2016 |
| EP | 3006326 A1 | 4/2016 |
| EP | 2098447 B1 | 6/2016 |
| EP | 2994380 B1 | 3/2017 |
| EP | 2994381 B1 | 3/2017 |
| EP | 2762402 A3 | 1/2018 |
| EP | 3172128 | 5/2018 |
| EP | 3974308 | 3/2022 |
| EP | 3974308 A1 | 3/2022 |
| EP | 3974309 | 3/2022 |
| EP | 3974309 A1 | 3/2022 |
| EP | 3974311 | 3/2022 |
| EP | 3974311 A1 | 3/2022 |
| FR | 2823177 | 10/2002 |
| FR | 2823177 B1 | 1/2004 |
| GB | 190008945 | 7/1900 |
| GB | 190008945 A | 7/1900 |
| JP | 2002096797 | 4/2002 |
| JP | 2002096797 A | 4/2002 |
| JP | 2004017902 | 1/2004 |
| JP | 2004017902 A | 1/2004 |
| JP | 3618560 | 2/2005 |
| JP | 3618560 B2 | 2/2005 |
| JP | 3963265 | 8/2007 |
| JP | 3963265 B2 | 8/2007 |
| JP | 4193683 | 12/2008 |
| JP | 4193683 B2 | 12/2008 |
| JP | 4209886 | 1/2009 |
| JP | 4209886 B2 | 1/2009 |
| JP | 4337522 | 9/2009 |
| JP | 4337522 B2 | 9/2009 |
| JP | 4376618 | 12/2009 |
| JP | 4376618 B2 | 12/2009 |

(56) References Cited

FOREIGN PATENT DOCUMENTS

| | | |
|---|---|---|
| JP | 2010228528 | 10/2010 |
| JP | 2010228528 A | 10/2010 |
| JP | 4857442 | 1/2012 |
| JP | 4857442 B2 | 1/2012 |
| JP | 5204682 | 6/2013 |
| JP | 5204682 B2 | 6/2013 |
| JP | 2014239607 | 12/2014 |
| JP | 2014239607 A | 12/2014 |
| JP | 5840969 | 1/2016 |
| JP | 5840969 B2 | 1/2016 |
| JP | 6187103 | 8/2017 |
| JP | 6187103 B2 | 8/2017 |
| KR | 20070111882 | 11/2007 |
| KR | 20070111882 A | 11/2007 |
| KR | 20140013199 | 2/2014 |
| KR | 20140013199 A | 2/2014 |
| KR | 20150144071 | 12/2015 |
| KR | 20150144071 A | 12/2015 |
| KR | 20160025713 | 3/2016 |
| KR | 20160025713 A | 3/2016 |
| KR | 1939760 B1 | 1/2019 |
| KR | 101939760 | 1/2019 |
| KR | 2355190 B1 | 2/2022 |
| KR | 102355190 | 2/2022 |
| RU | 2748813 | 5/2021 |
| RU | 2748813 C1 | 5/2021 |
| WO | 1999036312 | 11/1999 |
| WO | 1999036312 A3 | 11/1999 |
| WO | 2000006450 A1 | 2/2000 |
| WO | 2015007585 A1 | 1/2015 |
| WO | 2015007587 A1 | 1/2015 |
| WO | 2015074937 A1 | 5/2015 |
| WO | 2016008233 A1 | 1/2016 |
| WO | 2016074968 A1 | 5/2016 |
| WO | 2016107709 A1 | 7/2016 |
| WO | 2016180750 A1 | 11/2016 |
| WO | 2017055034 A1 | 4/2017 |
| WO | 2018059844 A1 | 4/2018 |
| WO | 2019020358 A1 | 1/2019 |
| WO | 2019020618 A1 | 1/2019 |
| WO | 2021049999 | 3/2021 |
| WO | 2022045986 A1 | 3/2022 |
| WO | 2022066616 A3 | 5/2022 |
| WO | 2022100671 A1 | 5/2022 |

OTHER PUBLICATIONS

Przybyl, Andrew, et al. Unpublished U.S. Appl. No. 17/983,976, "Propulsion Devices Having Electric Motors for Marine Vessels and Methods for Making the Same", filed Nov. 9, 2022.

Declaration of Aaron J. Novak, applicant admitted prior art of an existing KD-4 with propshaft driven pump known at least of as early as Feb. 14, 2022.

Mercury Avator Backpack, posted at powerboatsupply.com, first available Mar. 31, 2024, retrieved on Apr. 1, 2024, online, https://powerboatsupply.com/avator-electric-outboards/avator-accessories/mercury-avator-battery-carrying-backpack-8m0211714 (Year: 2024).

Nobelman Backpack for Women, posted at amazon.com, first available Aug. 9, 2022, retrieved on Mar. 27, 2024, online, https://www.amazon.com/NOBELMAN-Backpack-Waterproof-School-Daypack/dp/B0BKTJKBX4 (Year: 2022).

Swissdigital Laptop Backpack, posted at amazon.com, first available Mar. 2, 2020, retrieved on Mar. 27, 2024, online, https://www.amazon.com/Swissdigital-Backpack-Charging-Computer-15-6Inch/dp/B085CNBQMK (Year: 2020).

Victoriatourist Laptop Backpoack, posted at amazon.com, first available Jan. 13, 2021, retrieved on Mar. 27, 2024, online, https://www.amazon.com/Backpack-Business-Backpacks-Charing-Computers/dp/B08SWBTKBH (Year: 2021).

* cited by examiner

MARINE DRIVES HAVING AN ELECTRIC MOTOR ASSEMBLY AND METHODS FOR MAKING THE SAME

FIELD

The present disclosure generally relates to marine drives for propelling a marine vessel in water, and more particularly to marine drives having an electric motor.

BACKGROUND

The following U.S. Patent Publication provides background information.

U.S. Patent Pub. No. 2021/0114705 discloses a drive for a boat which includes a housing that is arranged under water during operation, and which houses an electric motor that drives a propeller. The housing includes a cooling section that includes a coolant duct.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a marine drive includes a torpedo housing having an open end and an electric motor assembly with an electric motor configured to power a propulsor for propelling the marine drive in water. The electric motor assembly includes a motor housing which is nested in the open end such that such that a first portion of the motor housing extends into the torpedo housing and such that a second portion of the motor housing extends from the torpedo housing and is exposed to the water for cooling thereof. The torpedo housing defines an opening which partially exposes the first portion of the motor housing to the water for cooling thereof.

Optionally, the opening is a first opening and wherein the torpedo housing further defines a second opening located on an opposite side of the torpedo housing relative to the first opening and which partially exposes the first portion of the motor housing to the water for cooling thereof. Optionally, a seal is between the motor housing and the torpedo housing and the seal prevents ingress of water to the torpedo housing. Optionally, the seal is located on an opposite side of the opening relative to the second portion of the motor housing. Optionally, the seal comprises an O-ring seal which surrounds the motor housing. Optionally, the opening is formed in a sidewall of the torpedo housing. Optionally, the sidewall extends around an entire periphery of the opening. Optionally, the opening is rectilinear and comprises a first beveled edge and an opposite second beveled edge which facilitate flow of the water across the first portion of the motor housing. Optionally, a groove in the motor housing facilitates flow of the water through the opening and between the torpedo housing and the motor housing. Optionally, the groove is one of a plurality of parallel grooves in the motor housing which facilitate flow of the water through the opening and between the torpedo housing and the motor housing. Optionally, the electric motor assembly has an output shaft and wherein the groove extends generally parallel to the output shaft. Optionally, the electric motor assembly has an output shaft and wherein the groove extends radially relative to the output shaft to permit flow of water across the motor housing covered by the torpedo housing. Optionally, the first portion of the electric motor assembly is connected to a power source via at least one electrical connector, and the opening is large enough to permit manual connection of the electrical connector to the first portion of the electric motor assembly within the torpedo housing. Optionally, the opening is a first opening and wherein the torpedo housing further defines a second opening located on an opposite side of the torpedo housing relative to the first opening and which partially exposes the first portion of the motor housing to the water for cooling thereof. The first opening and the second opening are large enough to permit manual connection of the electrical connector to the first portion of the electric motor assembly within the torpedo housing. Optionally, the opening is a cutaway in the open end of the torpedo housing. Optionally, the opening is one of a plurality of openings on a side of the torpedo housing and the plurality of openings forming a grate.

In certain examples, a method of making a marine drive includes the steps of providing an electric motor assembly having an electric motor configured to power a propulsor for propelling the marine drive in water, the electric motor assembly having a motor housing. The method can further includes the steps of providing a torpedo housing having a sidewall which leads to an open end, and an opening in the sidewall; inserting a first portion of the motor housing into the open end of the torpedo housing; via the opening in the sidewall, manually connecting an electrical connector within the torpedo housing to the first portion of the electric motor assembly; and/or further inserting and fastening the electric motor to the open end of the torpedo housing such that the first portion of the motor housing extends into the torpedo housing and such that a second portion of the motor housing extends from the torpedo housing and is exposed to the water for cooling thereof, and further wherein the opening partially exposes the first portion of the motor housing to the water for cooling thereof.

Optionally, torpedo housing is provided by casting. Optionally, the method includes the step of forming at least one groove in the motor housing. Optionally, the method includes the step of locating a seal between the first portion of the motor housing and the torpedo housing to prevent ingress of the water to the torpedo housing.

Various other features, objects and advantages of the disclosure will be made apparent from the following description taken together with the drawings.

BRIEF DESCRIPTION OF THE DRAWINGS

The present disclosure is described with reference to the following drawings.

DETAILED DISCLOSURE

Figure 1:
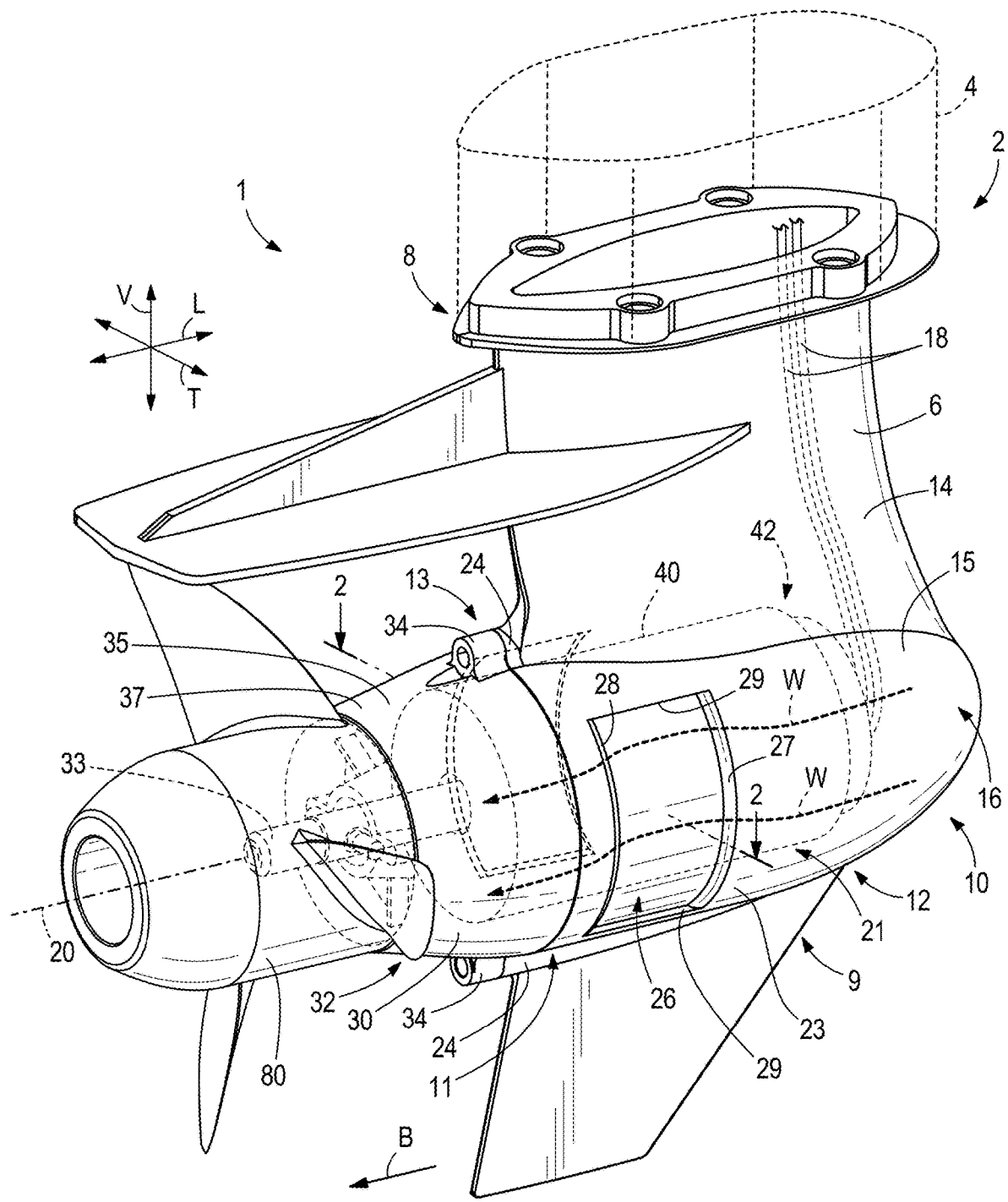
FIG. 1 is a perspective view of an example marine drive according to the present disclosure.

The present disclosure generally relates to marine propulsion devices, and specifically to marine propulsion devices that have one or more electric motors positioned within their drive housings. FIG. 1 depicts a lower portion of a marine drive 1 according to the present disclosure, which includes a drive housing 2 having an upper casing 4 (depicted in dashed lines on FIG. 1) and a lower casing 6 which are coupled together in a manner known in the art. The upper casing 4 and the lower casing 6 may alternatively be integrally formed together or formed from more than two pieces. The drive housing 2 is configured to be coupled to, or otherwise integrated with, a marine vessel in a manner known in the art for propelling the marine vessel in water.

The lower casing 6 extends vertically between a top 8 and a bottom 9 (see example vertical axis V), longitudinally between a first end 10 and a second end 11 (see example longitudinal axis L), and transversely between opposing sides 12, 13 (see example transverse axis T). The lower casing 6 includes an upper housing 14 and a torpedo housing 15 vertically below the upper housing 14. The torpedo housing 15 extends between the ends 10, 11, is centered on a longitudinally extending first axis 20, and defines an internal cavity 21 that also extends along the first axis 20. The torpedo housing 15 includes a nose 16 that is at the first end 10 of the lower casing 6 and a perimeter sidewall 23 that encircles the cavity 21. A torpedo housing 15 has an open end 22 (FIG. 3) at the second end 11 that permits insertion of at least a portion of a motor assembly 30 (described further herein below) into the cavity 21. In certain examples, the sidewall 23 extends around the entire periphery of the open end 22. Note that the nose 16 and/or the first end 10 of the lower casing 6 is a closed end such that the cavity 21 is generally inaccessible at the first end 10.

The cavity 21 is sized and shaped such that the motor assembly 30 can be at least partially positioned therein when the marine drive 1 is fully assembled. The motor assembly 30 may include an electric motor 40 (schematically depicted in dashed lines in FIG. 2) that provides rotation when powered, as well as a motor housing 35, control board, power board, transformer, bearings, rotation sensors, current sensors, and/or other elements conventionally packaged as an assembly. The electric motor 40 within the motor assembly 30 may be an axial flux motor, a radial flux motor, or a transverse flux motor such as those produced by Electric Torque Machines of Flagstaff, Arizona (a Graco Company).

Figure 2:
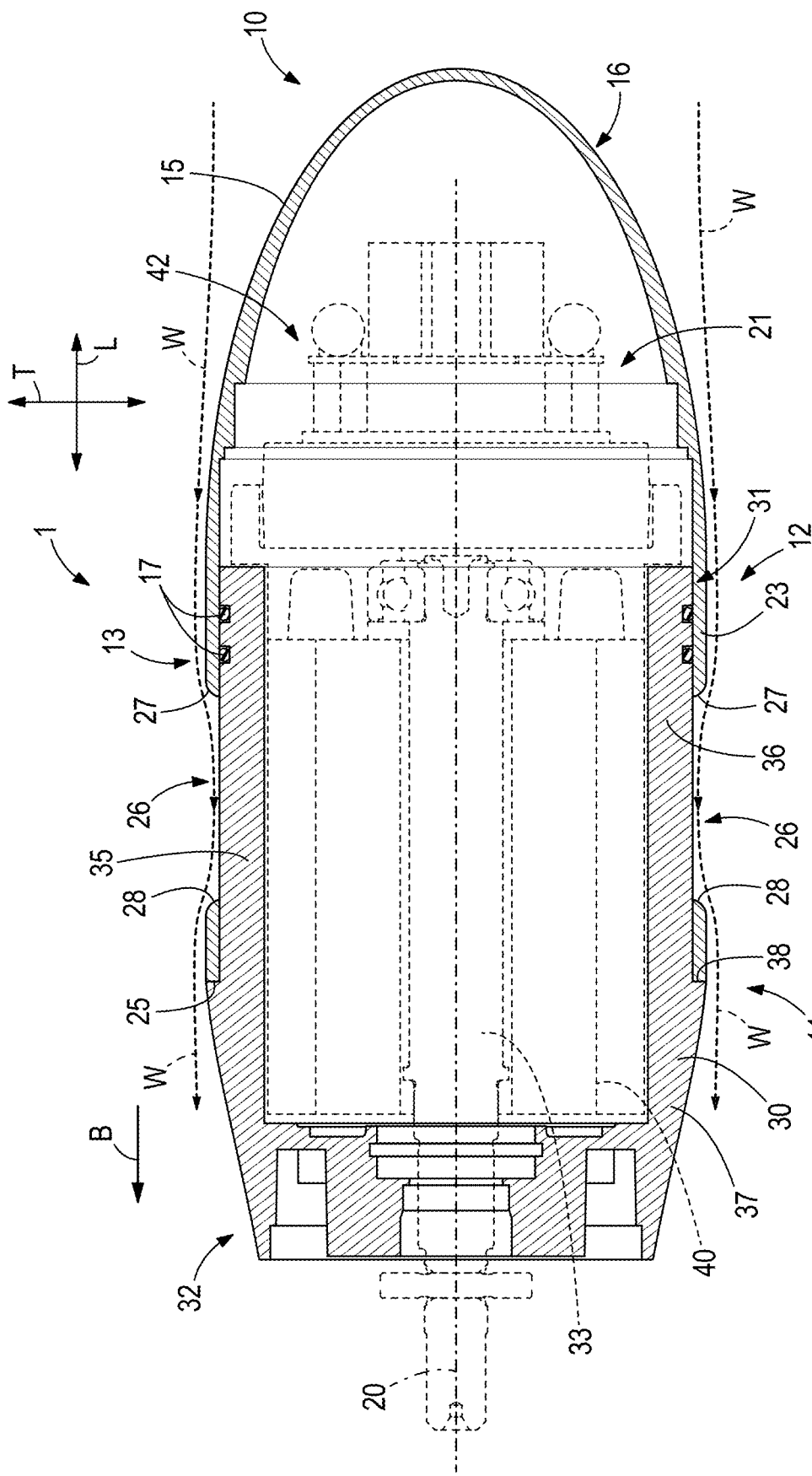
FIG. 2 is a cross-sectional view of the marine drive of FIG. 1 along line 2-2 on FIG. 1.

The motor assembly 30 extends between a first end 31 (FIG. 3) and an opposite second end 32. A propeller shaft 33 extends away from the second end 32 of the motor assembly 30 along the first axis 20 and is rotatable via operation of the motor assembly 30. The motor assembly 30 may be coupled to the lower casing 6 in a manner known in the art. In the configuration of FIGS. 1 and 2, the motor assembly 30 is not entirely positioned within the cavity 21 when coupled to the lower casing 6. Rather, the first end 31 of the motor assembly 30 is nested in the cavity 21 with the second end 32 extending from the second end 11 of the lower casing 6.

The motor assembly 30 includes one or more flanges 34 that correspond to flanges 24 of the lower casing 6. Fasteners (not depicted; e.g., screws or bolts) extend through openings in the flanges 24, 34 to draw the motor assembly 30 tightly against the second end 11 of the lower casing 6. Seals 17 can be provided between the motor assembly 30 and the second end 11 of the lower casing 6 to thereby form a water-tight connection. In non-limiting the examples, the seals 17 are O-rings that encircle and surround a motor housing 35 (described below) of the motor assembly 30.

The motor assembly 30 also includes a motor housing 35 (see FIG. 3) having a front first portion 36 adjacent to the first end 31 and a rear second portion 37 adjacent to the second end 32. The first portion 36 is centered about the first axis 20 and has a generally cylindrical shape. The second portion 37 is also centered about the first axis 20 and has a generally truncated cone shape. The second portion 37 tapers inwardly toward the first axis 20 in a first direction (see arrow B on FIG. 2) that extends in the direction away from the first portion 36 toward the second end 37. As such, the second portion 37 extends from the torpedo housing 15 and is exposed to the water. The second portion 37 includes an annular intermediate surface 38 that is configured to face a corresponding end surface 25 (see FIG. 3) of the lower casing 6. As depicted in FIG. 2, when the motor assembly 30 is securely seated in the cavity 21 of the lower casing, the intermediate surface 38 is adjacent to and/or abuts the end surface 25. Note that in certain instances, a second seal (not depicted) is provided between the surfaces 38, 25.

Figure 3:
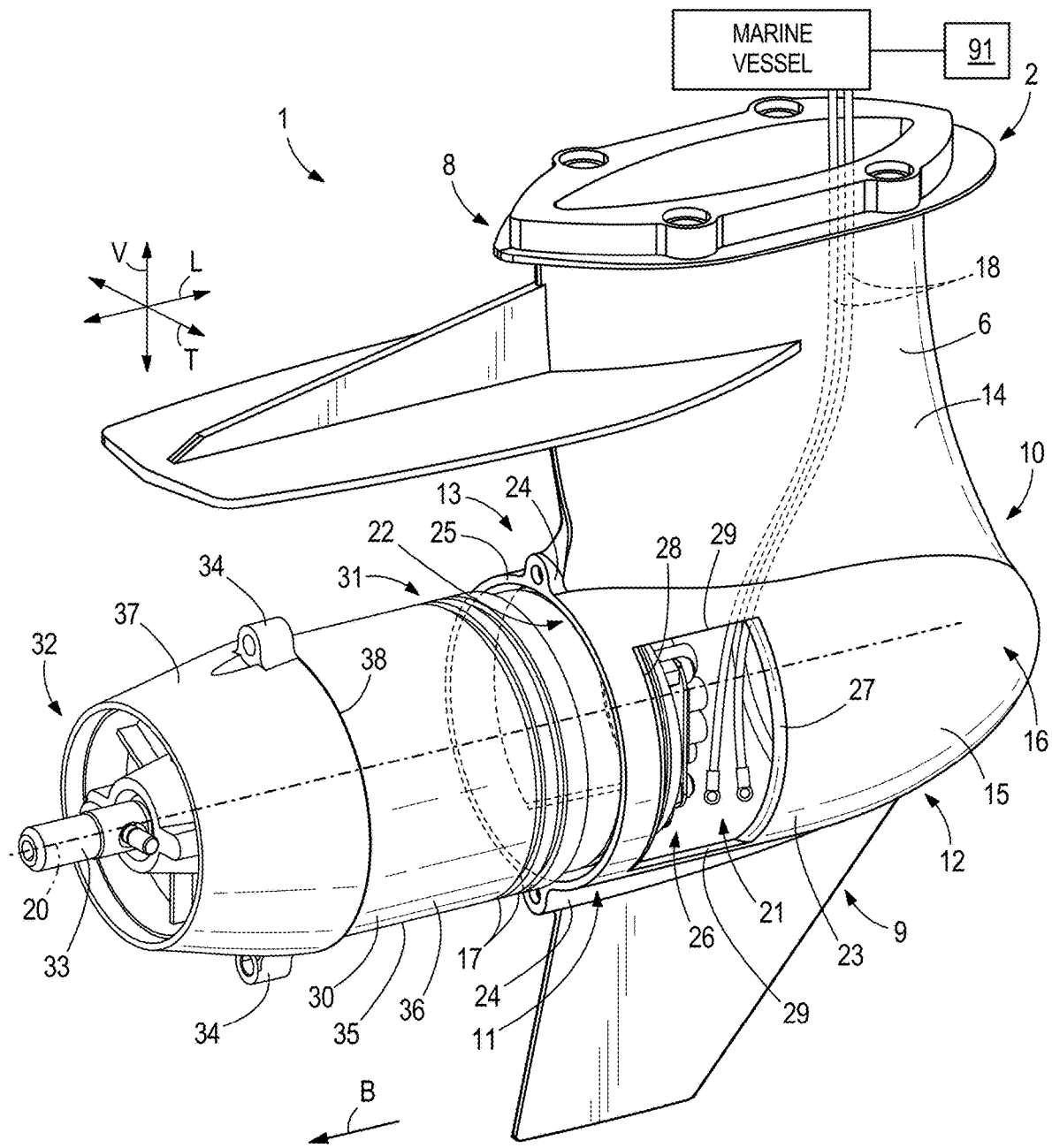
FIG. 3 is a partial exploded view of the marine drive of FIG. 1.

With continued reference to FIG. 1-3, a propulsor, such as a jet, an impeller, a propeller 80 (FIG. 1), and/or the like is operatively coupled to the propeller shaft 33 of the motor assembly 30 such that as the motor assembly 30 rotates the propeller shaft 33, the propeller 80 is rotated about the first axis 20 to thereby provide propulsion for a marine vessel in the water. The propeller 80 is positioned against the second end 32 of the motor assembly 30. A seal (not shown) may also be provided between the propeller 80 and the second end 32 of the motor assembly 30 to prevent water ingress. Rotation may be transmitted from the motor assembly 30 to the propeller 80 in a manner known in the art, including directly connecting to a motor shaft extending from the motor, or indirectly through gears, pulleys, or additional shafts with couplers, for example. It should be recognized that while the present disclosure primarily shows the propeller 80 being aft of the drive housing 2, the present disclosure also relates to other types and configurations of propulsor devices, including tractor or pulling-type propulsion devices.

Additional information is now provided regarding electrically coupling the motor assembly 30 so as to receive power and/or control signals when coupled within the drive housing 2. Referring to FIG. 1, one or more electrical connectors 18 (FIG. 3), such as wires and cables, through the drive housing 2. The electrical connectors 18 are electrically coupled to the motor assembly 30 and/or the electric motor 40 (FIG. 2). It should be recognized that the present disclosure also contemplates configurations in which multiple conduits are used (e.g., one for communication conductors and another for power conductors, separate conduits for each power conductor, or other combinations thereof). The power may be provided by a power source 91 (depicted schematically on FIG. 3), for example one or more batteries or other energy storage systems, and/or energy production systems (e.g., wind power systems, solar power systems, or a gas generator), on the marine vessel.

The present inventors have recognized that during operation of the motor 40 (FIG. 2), the motor generates heat and that certain components of the motor assembly 30, such as motor 40 (FIG. 2) and the control board (not depicted), must be cooled to maintain efficient operation and maximize useful life. If the motor assembly 30 is not properly cooled, certain components may malfunction and/or become damaged thereby requiring time-consuming and/or costly repair. These problems are further exacerbated by the heat generated by increasingly more powerful and/or larger motors. In addition, heat generated by components of the motor assembly 30 may cause expansion/contraction of components thereby leading to material stresses in and/or between these components. These stresses may damage seals, cause cracking of components, and/or ingress of water into the motor assembly 30 or the cavity 21. Through experimentation and research, the present inventors have developed the presently disclosed marine drives having features and methods for cooling the motor assembly 30 and the components thereof, as described hereinbelow.

Still referring to FIGS. 1-3, the motor housing 35 is adjacent to and/or abuts the motor 40 and thus, the motor housing 35 is a heat sink for heat generated by the motor 40 and other heat-generating components of the motor assembly 30. The motor housing 35 is cooled by water surrounding the motor assembly 30, and as such, heat flows from the heat-generating components of the motor assembly 30 into the water. As noted above, the second portion 37 of the motor housing 35 extends from the torpedo housing 15 and is exposed to the water and thus the second portion 37 is cooled by the water. The present inventors have endeavored to increase flow of water across the motor housing 35 and thereby increase transfer of heat from the motor housing 35 to the water. Accordingly, the present inventors have provided one or more openings 26 in the sidewall 23 of the torpedo housing 15 to thereby expose additional portions of the motor housing 35 to the water for cooling thereof and thereby increase transfer of heat from the motor housing 35 to the water.

The openings 26 depicted in FIGS. 1-3 expose the first portion 36 of the motor housing 35 (which is positioned in the torpedo housing 15) to the water for cooling thereof. Arrows W on FIG. 2 depict the path of the water along the torpedo housing 15 and the motor housing 35 as the marine drive 1 moves through water in the first direction (arrow B).

The number of openings 26 defined in the sidewall 23 of the torpedo housing 15 can vary. In one non-limiting example, the torpedo housing 15 includes a pair of openings 26, namely a first opening and a second opening, and the second opening 26 is located on an opposite side of the torpedo housing 15 relative to the first opening 26 such that both the first and second openings 26 partially expose the first portion 36 of the motor housing 35 to the water for cooling thereof. In certain non-limiting examples, the openings 26 form a grate. Note that the seals 17 are located on an opposite side of the opening 26 relative to the second portion 37 of the motor housing 35 (see FIG. 3).

The shape of the opening 26 can vary, and in the example depicted, the opening 26 has a rectilinear shape with a front first edge 27 and an opposite rear second edge 28. The edges 27, 28 facilitate flow of the water into the opening 26 and across the first portion 36 of the motor housing 35. In certain non-limiting examples, the edges 27, 28 are rounded or beveled edges. Note that in certain examples, when the edges 27, 28 are angular or square edges, the edges 27, 28 may introduce flow separation and increase the possibility of cavitation and/or increased salt deposit. As such, certain example edges 27, 28 may be rounded or beveled to advantageously reduce or eliminate the problems noted above when the edges 28, 28 are angular or square edges. In certain non-limiting examples, the edges 27, 28 extend about a radius. Note that in certain non-limiting examples, the shape of the first edge 27 (e.g., straight, rounded, beveled) is different than the shape of the second edge 28. A pair of edges 29, namely a third edge and a fourth edge, extend between the first and second edges 27, 28 and parallel with the first axis 20. Note that the present inventors have also recognized that electric motors can be difficult to install into conventional drive housings because the thickness and/or stiffness or rigidity of the electrical connectors that must be attached to the electric motor often before the electric motor is inserted into the housing. As such, the openings 26 in the drive housings 2 of the present disclosure which are described herein advantageously permit the technician to connect the electrical connectors to the electric motor via the openings 26 and/or when the electric motor is partially inserted into the cavity. In certain non-limiting examples, the opening 26 is large enough to permit manual connection of the electrical connector 18 (see FIG. 3) to the front portion 42 of the electric motor 40 (FIG. 2) within the torpedo housing 15.

Figure 4:
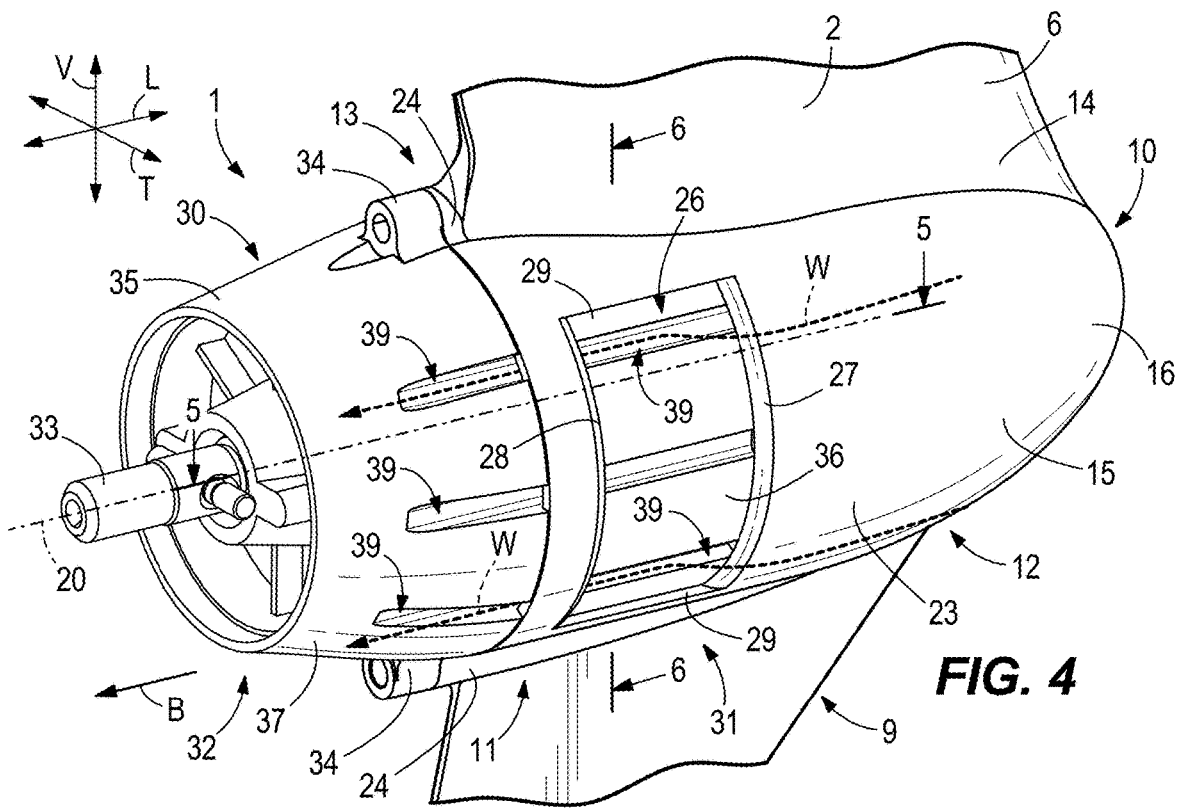
FIG. 4 is a perspective view of another example marine drive according to the present disclosure.
Figure 5:
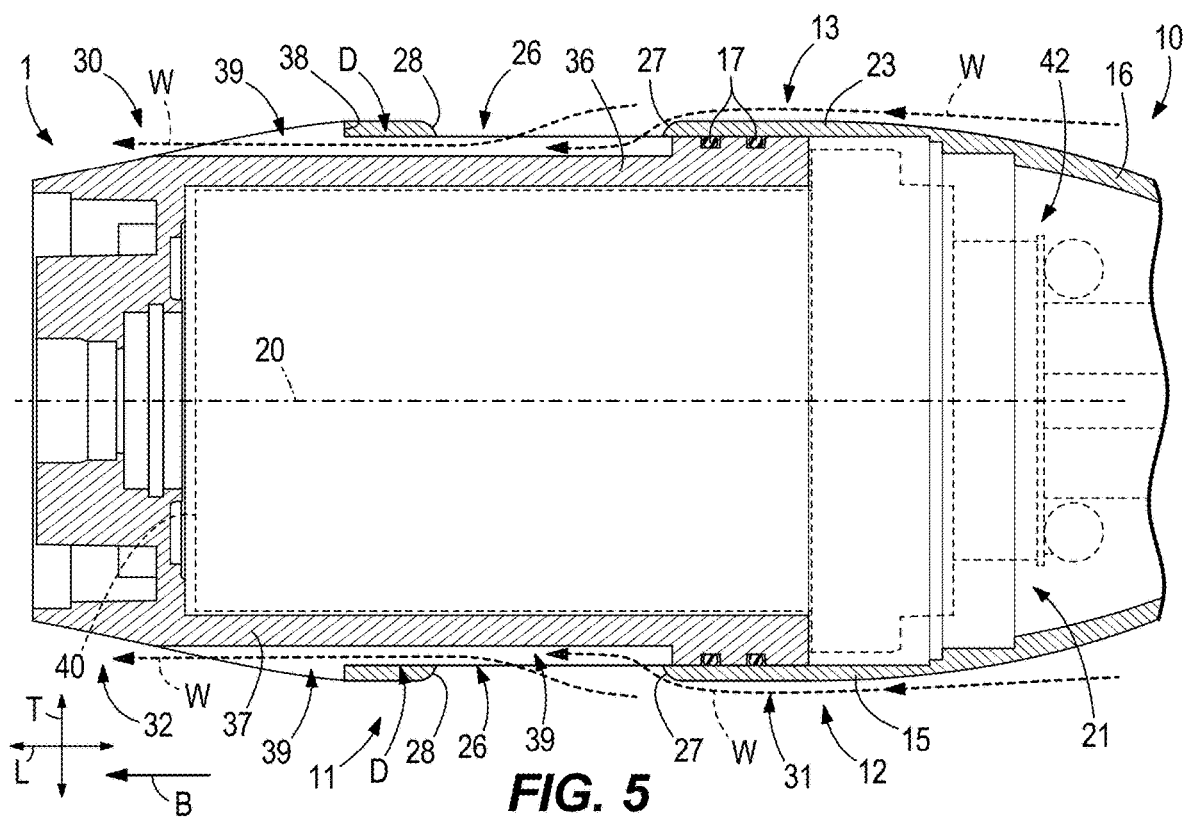
FIG. 5 is a cross-sectional view of the marine drive of FIG. 4 along line 5-5 on FIG. 4.
Figure 6:
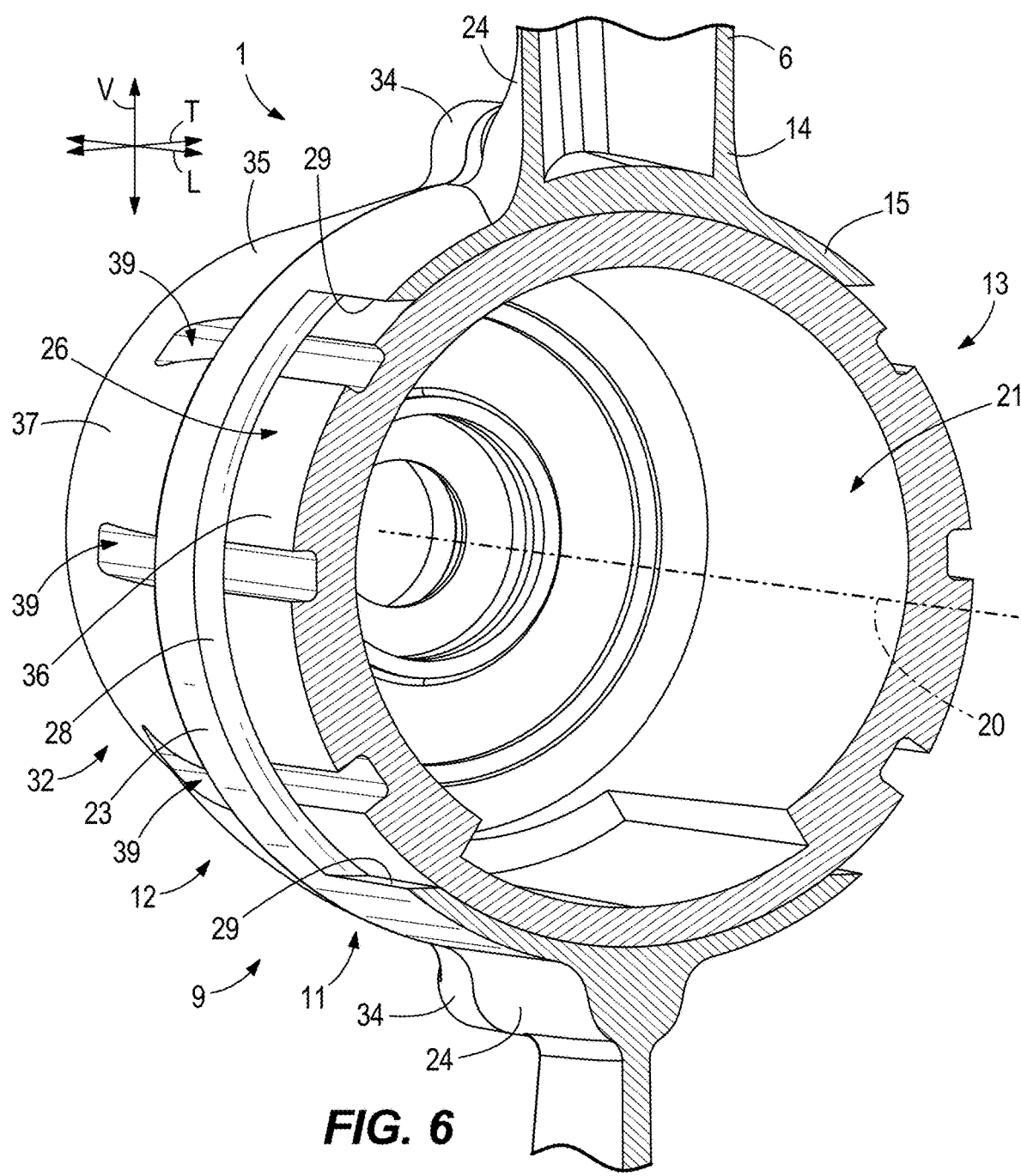
FIG. 6 is a cross-sectional view of the marine drive of FIG. 4 along line 6-6 on FIG. 4.

Referring now to FIGS. 4-6, another example marine drive 1 of the present disclosure is depicted. The marine drive 1 includes one or more grooves 39 recessed in the motor housing 35 such that water flows through the grooves 39. The grooves 39 facilitate flow of the water through the opening 26 and between the torpedo housing 15 and the motor housing 35 (arrows D on FIG. 5 depict the location at which the water flows between the torpedo housing 15 and the motor housing 35. The grooves 39 are defined in the first portion 36 and the second portion 37 of the motor housing 35. Note that in example depicted in FIGS. 4-6, the grooves 39 are positioned in the motor housing 35 such that the grooves 39 are in fluid communication and aligned with the openings 26. As such, water flows through the openings 26, into the grooves 39, between the torpedo housing 15 and the motor housing 35, and out of the portions of grooves 39 along the second portion 37. In certain non-limiting examples, the grooves 39 extend generally parallel to the first axis 20 and the propeller shaft 33.

Figure 7:
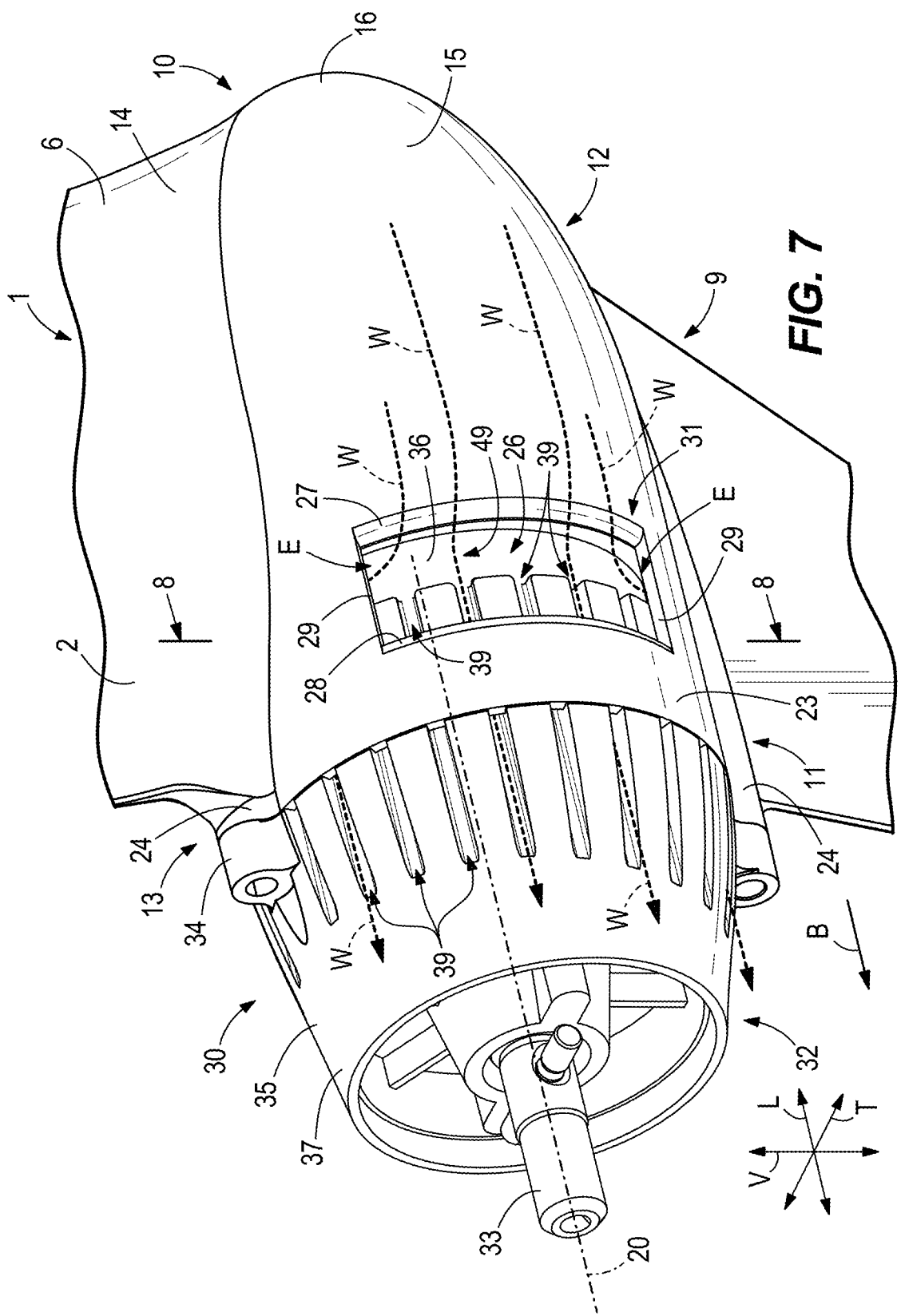
FIG. 7 is a perspective view of another example marine drive according to the present disclosure.
Figure 8:
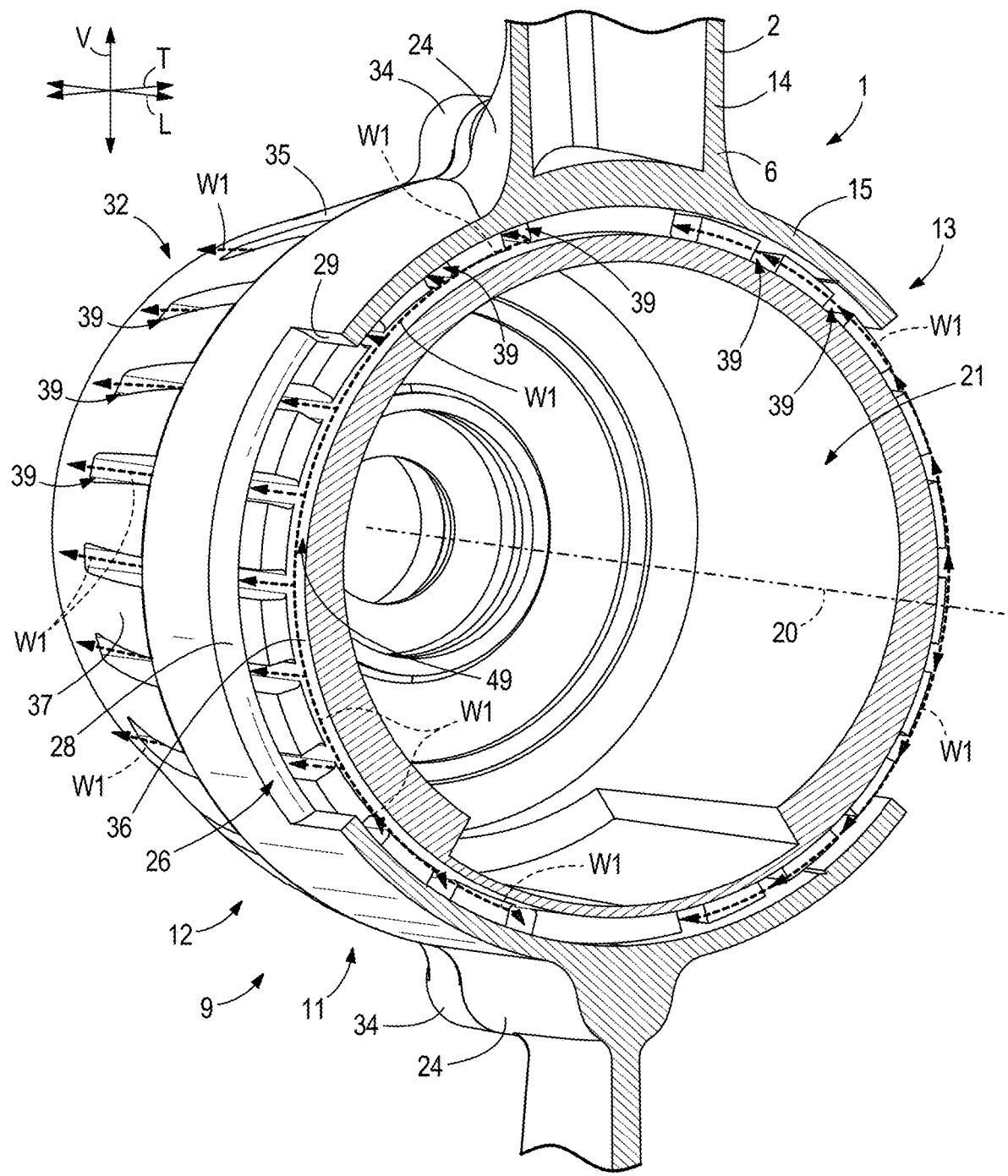
FIG. 8 is a cross-sectional view of the marine drive of FIG. 7 along line 8-8 on FIG. 7.

FIGS. 7-8 depict another example marine drive 1 of the present disclosure. The marine drive 1 includes first grooves 39, similar to the grooves 39 described above with respect FIGS. 4-6), that extend generally parallel to the first axis 20 and the propeller shaft 33 and one or more second grooves 49 that extend radially with respect to the first axis 20 and the propeller shaft 33. The grooves 39, 49 are in fluid communication with each other and the openings 26 such that the water flows through the openings 26, through the second groove 49, into the first grooves 39, and out through the portion of the grooves 39 along the second portion 37 (see arrows W on FIG. 7). Note that the water not only flows generally parallel to the first axis 20, but also radially along the motor housing 35 (see arrow E on FIG. 7 that depicts an area in which the water radially flows along the motor housing 35 and arrows W1 on FIG. 8 depicting radial and axial flow of the water). At least a portion of the second groove 49 is covered by the torpedo housing 15, and thus, the second groove 49 permits flow of water across at least a portion of the motor housing 35 covered by the torpedo housing 15.

Figure 9:
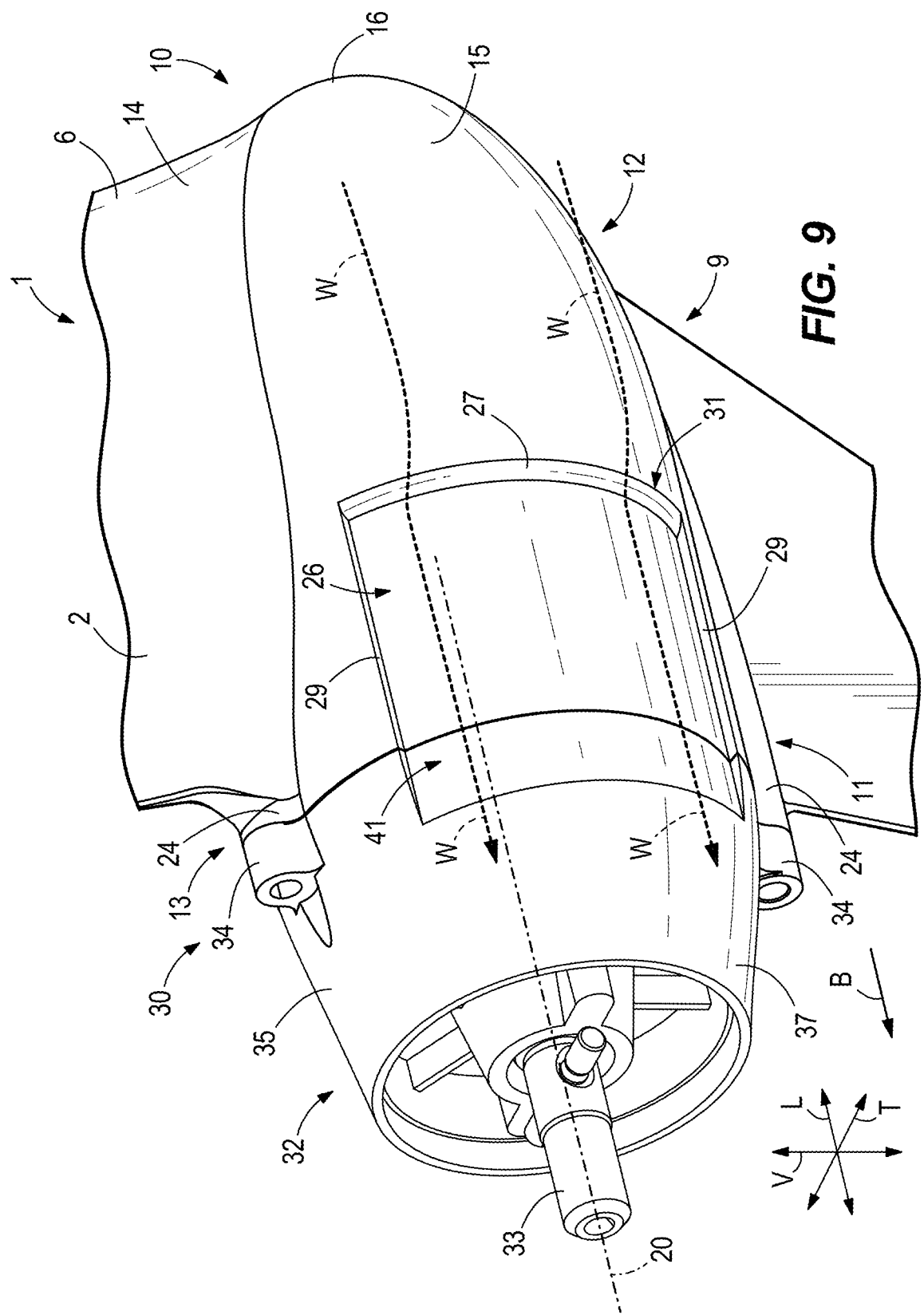
FIG. 9 is a perspective view of another example marine drive according to the present disclosure.

FIG. 9 depicts an FIGS. 7-8 depict another example marine drive 1 of the present disclosure. The marine drive 1 includes at least one opening that is a cutaway in the open end of the torpedo housing 15. The opening has the first edge 27, and the motor housing 15 has a cutout 41 in the second portion 37 of the motor housing 35. The cutout 41 is aligned with the opening 26 such that water flows through the opening 26 thereby cooling the first portion 36 of the motor housing 35 and through the cutout 41.

In certain examples, a marine drive includes a torpedo housing having an open end and an electric motor assembly with an electric motor configured to power a propulsor for propelling the marine drive in water. The electric motor assembly includes a motor housing which is nested in the open end such that such that a first portion of the motor housing extends into the torpedo housing and such that a second portion of the motor housing extends from the torpedo housing and is exposed to the water for cooling thereof. The torpedo housing defines an opening which partially exposes the first portion of the motor housing to the water for cooling thereof.

Optionally, the opening is a first opening and wherein the torpedo housing further defines a second opening located on an opposite side of the torpedo housing relative to the first opening and which partially exposes the first portion of the motor housing to the water for cooling thereof. Optionally, a seal is between the motor housing and the torpedo housing and the seal prevents ingress of water to the torpedo housing. Optionally, the seal is located on an opposite side of the opening relative to the second portion of the motor housing. Optionally, the seal comprises an O-ring seal which surrounds the motor housing. Optionally, the opening is formed in a sidewall of the torpedo housing. Optionally, the sidewall extends around an entire periphery of the opening. Optionally, the opening is rectilinear and comprises a first beveled edge and an opposite second beveled edge which facilitate flow of the water across the first portion of the motor housing. Optionally, a groove in the motor housing facilitates flow of the water through the opening and between the torpedo housing and the motor housing. Optionally, the groove is one of a plurality of parallel grooves in the motor housing which facilitate flow of the water through the opening and between the torpedo housing and the motor housing. Optionally, the electric motor assembly has an output shaft and wherein the groove extends generally parallel to the output shaft. Optionally, the electric motor assembly has an output shaft and wherein the groove extends radially relative to the output shaft to permit flow of water across the motor housing covered by the torpedo housing. Optionally, the first portion of the electric motor assembly is connected to a power source via at least one electrical connector, and the opening is large enough to permit manual connection of the electrical connector to the first portion of the electric motor assembly within the torpedo housing. Optionally, the opening is a first opening and wherein the torpedo housing further defines a second opening located on an opposite side of the torpedo housing relative to the first opening and which partially exposes the first portion of the motor housing to the water for cooling thereof. The first opening and the second opening are large enough to permit manual connection of the electrical connector to the first portion of the electric motor assembly within the torpedo housing. Optionally, the opening is a cutaway in the open end of the torpedo housing. Optionally, the opening is one of a plurality of openings on a side of the torpedo housing and the plurality of openings forming a grate.

In certain examples, a method of making a marine drive includes the steps of providing an electric motor assembly having an electric motor configured to power a propulsor for propelling the marine drive in water, the electric motor assembly having a motor housing. The method can further includes the steps of providing a torpedo housing having a sidewall which leads to an open end, and an opening in the sidewall; inserting a first portion of the motor housing into the open end of the torpedo housing; via the opening in the sidewall, manually connecting an electrical connector within the torpedo housing to the first portion of the electric motor assembly; and/or further inserting and fastening the electric motor to the open end of the torpedo housing such that the first portion of the motor housing extends into the torpedo housing and such that a second portion of the motor housing extends from the torpedo housing and is exposed to the water for cooling thereof, and further wherein the opening partially exposes the first portion of the motor housing to the water for cooling thereof.

Optionally, torpedo housing is provided by casting. Optionally, the method includes the step of forming at least one groove in the motor housing. Optionally, the method includes the step of locating a seal between the first portion of the motor housing and the torpedo housing to prevent ingress of the water to the torpedo housing.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A marine drive comprising:
   a torpedo housing that axially extends between a closed end and an open end, an internal cavity being defined between the closed end and the open end;
   an electric motor configured to power a propulsor for propelling the marine drive in a body of water, the electric motor having a motor housing with a first portion located inside the internal cavity and a second portion located outside the internal cavity so that the second portion is directly exposed to the body of water, wherein the torpedo housing defines an opening that directly exposes a portion of the first portion of the motor housing that is aligned with the opening to the body of water, and further comprising a groove in a radially outermost surface of the motor housing that facilitates flow of the water through the opening and between the torpedo housing and the motor housing.

2. The marine drive according to claim 1, wherein the opening is a first opening and wherein the torpedo housing further defines a second opening located on an opposite side of the torpedo housing relative to the first opening and which partially exposes another portion of the first portion of the motor housing aligned with the second opening to the body of water for cooling thereof.

3. The marine drive according to claim 1, further comprising a seal between the motor housing and the torpedo housing, the seal configured to prevent ingress of water to the torpedo housing, wherein the seal comprises an O-ring seal that surrounds the first portion of the motor housing and is located on an opposite side of the opening relative to the second portion of the motor housing.

4. The marine drive according to claim 1, wherein the opening is rectilinear and comprises a first beveled edge and an opposite second beveled edge which facilitate flow of the water across the first portion of the motor housing.

5. The marine drive according to claim 1, wherein the groove is one of a plurality of grooves in the radially outermost surface of the motor housing that facilitates flow of the water through the opening and between the torpedo housing and the motor housing.

6. The marine drive according to claim 1, wherein the electric motor has an output shaft and wherein the groove extends generally parallel to the output shaft.

7. The marine drive according to claim 1, wherein the electric motor has an output shaft and wherein the groove extends radially relative to the output shaft to permit flow of water across the motor housing covered by the torpedo housing.

8. The marine drive according to claim 1, wherein the first portion of the electric motor is connected to a power source via at least one electrical connector, and wherein the opening is configured to facilitate manual connection of the electrical connector to the first portion of the electric motor within the torpedo housing via the opening.

9. The marine drive according to claim 8, wherein the opening is a first opening and wherein the torpedo housing further defines a second opening located on an opposite side of the torpedo housing relative to the first opening and which directly exposes a portion of the first portion of the motor housing that is aligned with the second opening to the body of water, and wherein the first opening and the second opening are configured to facilitate manual connection of the electrical connector to the first portion of the electric motor within the torpedo housing via the opening.

10. A marine drive comprising:
a torpedo housing that axially extends between a closed end and an open end, and an internal cavity being defined between the closed end and the open end;
an electric motor configured to power a propulsor for propelling the marine drive in a body of water, wherein the electric motor includes a motor housing having a first portion located inside the internal cavity and a second portion located outside of the internal cavity so that the second portion is directly exposed to the body of water, wherein the torpedo housing defines an opening that directly exposes a portion of the first portion of the motor housing that is aligned with the opening to the body of water; and
a plurality of grooves in a radially outermost surface of the motor housing, the plurality of grooves configured to facilitate flow of the water through the opening and between the torpedo housing and the motor housing from the first portion of the motor housing to the second portion of the motor housing.

11. The marine drive according to claim 10, wherein the grooves in the plurality of grooves are parallel and extend along the first portion of the motor housing and along the second portion of the motor housing.

12. The marine drive according to claim 11, wherein the electric motor has an output shaft, and wherein the plurality of grooves extends substantially parallel to the output shaft.

13. The marine drive according to claim 12, further comprising at least one additional groove that extends radially relative to the output shaft to facilitate flow of water across the first portion of the motor housing between the motor housing and the torpedo housing.

14. The marine drive according to claim 10, wherein the opening is a first opening and wherein the torpedo housing further defines a second opening located on an opposite side of the torpedo housing relative to the first opening and which partially exposes a portion of the first portion of the motor housing that is aligned with the second opening to the body of water.

15. The marine drive according to claim 14, wherein the plurality of grooves extends along the first portion of the motor housing and along the second portion of the motor housing and includes grooves that facilitate flow of the water through the first opening and between the torpedo housing and the motor housing from the first portion of the motor housing to the second portion of the motor housing, and through the second opening and between the torpedo housing and the motor housing from the first portion of the motor housing to the second portion of the motor housing.

16. The marine drive according to claim 15, wherein the electric motor has an output shaft and further comprising at least one additional groove that extends radially relative to the output shaft to facilitate flow of water across the first portion of the motor housing between the motor housing and the torpedo housing.

17. The marine drive according to claim 16, wherein the plurality of grooves extends substantially parallel to the output shaft.

18. A marine drive comprising:
a torpedo housing that axially extends between a closed end and an open end, an internal cavity being defined between the closed end and the open end; and
an electric motor configured to power a propulsor for propelling the marine drive in a body of water, wherein the electric motor includes a motor housing having a first portion located inside the internal cavity and a second portion located outside of the internal cavity so that the second portion is directly exposed to the body of water,
wherein the torpedo housing defines an opening that directly exposes a portion of the first portion of the motor housing that is aligned with the opening to the body of water, and wherein the motor housing has a radially outer surface with a cutout that is aligned with the opening such that together the portion of the first portion of the motor housing and the cutout provide a contiguous recessed area that is directly exposed to the body of water.

* * * * *